UNITED STATES PATENT OFFICE.

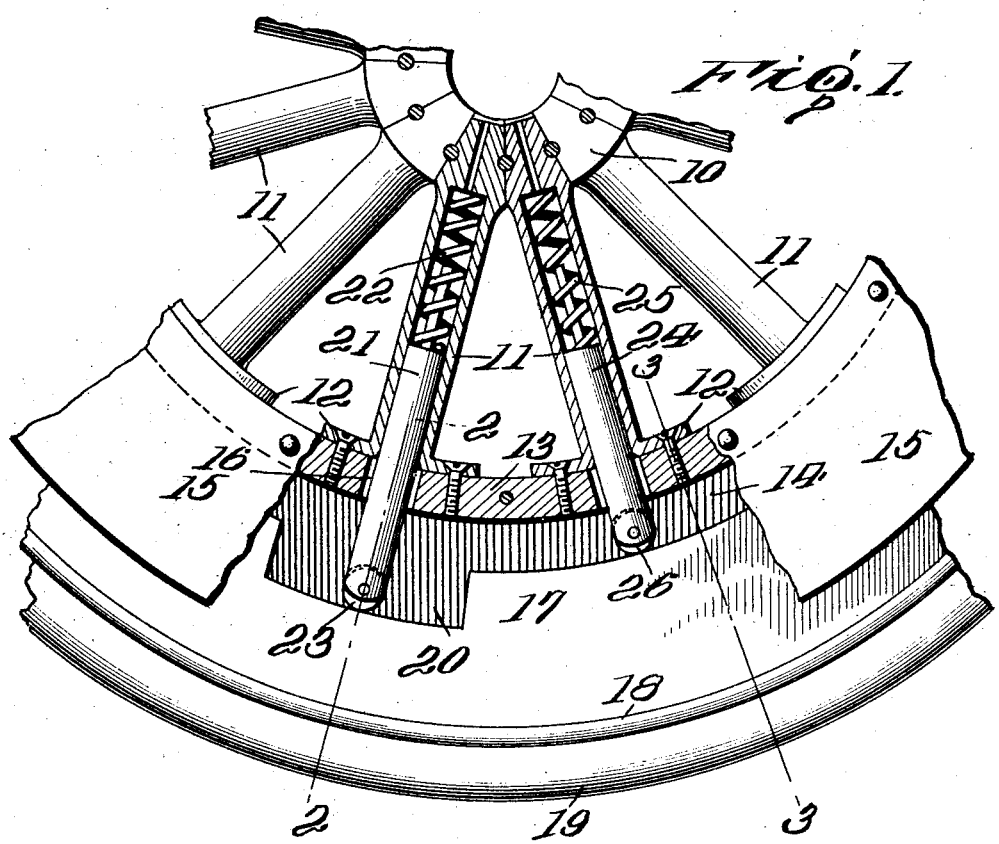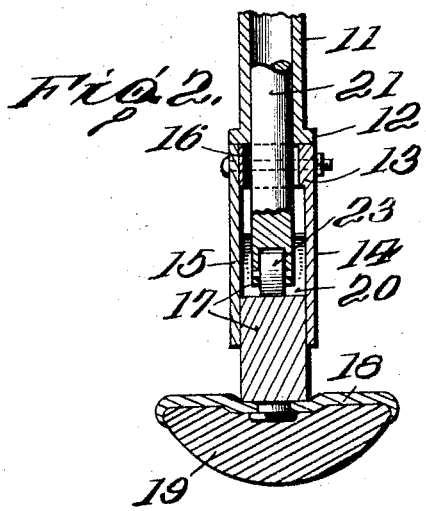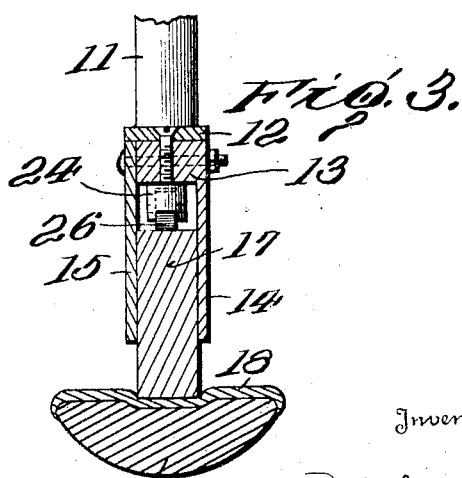

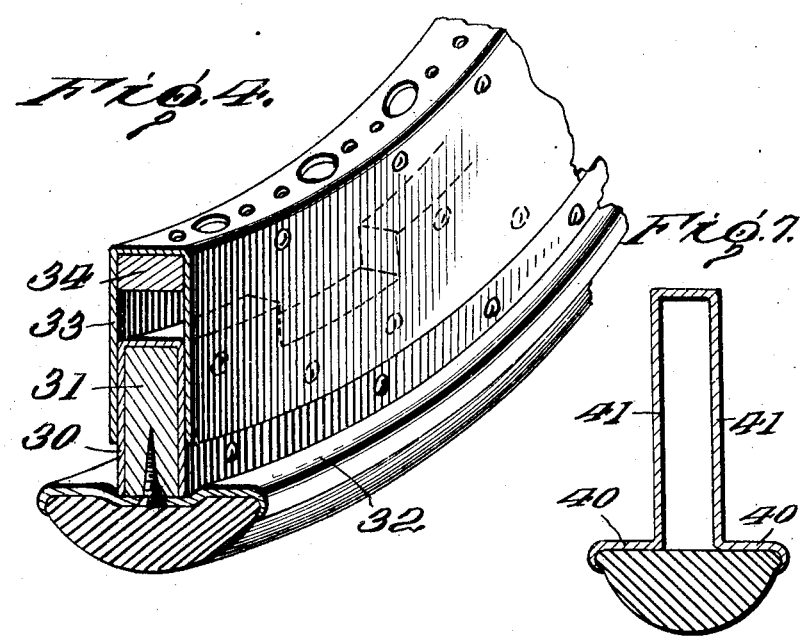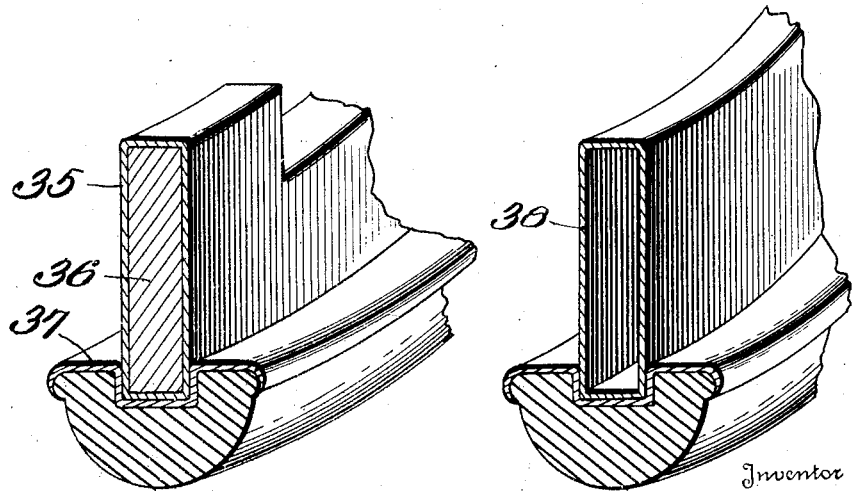

HENRY NICHOLS, OF NEW YORK, N. Y.

RESILIENT WHEEL.

1,404,046.  Specification of Letters Patent.  Patented Jan. 17, 1922.

Application filed September 3, 1919. Serial No. 321,406.

*To all whom it may concern:*

Be it known that I, HENRY NICHOLS, a citizen of the United States, residing at New York city, State of New York, have invented new and useful Improvements in Resilient Wheels, of which the following is a specification.

This invention is a wheel of the type in which the tread is resiliently connected to the body of the wheel.

One of the objects of the invention is to provide an inexpensive wheel of simple construction which will be sufficiently strong to withstand the ordinary loads applied to motor vehicles, and yet possess sufficient resiliency to render pneumatic tires unnecessary. A further object is to provide a wheel of the character mentioned in which the parts may be readily separated and reassembled for purposes of repair and adjustment. A further object is to provide a resilient wheel capable of imparting a starting shock to the tread portion of the wheel to initiate rotation thereof.

The invention will be hereinafter fully set forth and particularly pointed out in the claims.

In the accompanying drawings:—

Figure 1 is a side elevation illustrating a wheel constructed in accordance with the invention. Figure 2 is a transverse sectional view on the line 2—2, Figure 1. Figure 3 is a similar view on the line 3—3, Figure 1. Figures 4, 5, 6 and 7 are detail sectional views illustrating slight modifications.

Referring to Figure 1, 10 designates the hub, provided with a plurality of radiating tubular spokes 11, the inner ends of which are joined to the hub in any suitable manner. The outer ends of the spokes are provided with flanges 12, curved to conform to the felly 13, to which they are attached in any suitable manner. The felly is provided with two parallel flanges 14 and 15, the latter of which is removably attached to the felly by suitable securing means, such as nuts and bolts. The felly is also provided with holes 16 in alignment with the bores of the spokes, as shown.

Telescoping between the flanges 14 and 15 of the felly, is a tread member 17, mounted to have radial movement between the flanges. Secured to said tread member in any desired manner, is a rim 18, which may be constructed and shaped to receive any form of tire, conventionally indicated at 19. Said tread member is provided with a series of spaced apart recesses 20, four of such recesses being shown, although a greater or a lesser number may be provided, as desired.

Working in certain of the hollow spokes 11, i. e. those registering with the recesses 20, are plungers 21, bearing at their inner ends against springs 22, located within the spokes, said plungers having reduced extensions around which the springs are coiled. The outer ends of said plungers are provided with anti-friction rollers 23 which bear against the bottom walls of the respective recesses 20. A set of similar plungers 24, but shorter in length, are arranged within the other hollow spokes, being normally pressed outwardly by springs 25, and having anti-friction rollers 26, bearing on the inner surface of the tread member 17. It will be noted that the plungers 21 and 24 are in no way attached to said tread member 17.

In practice, the plungers 21 and 24 are normally forced out by the springs, and the weight of the load is sustained from the tread member by said plungers and springs. By reason of the recesses 20, the tread member is permitted to have a certain amount of circumferential movement which is limited by the plungers 21, and said tread member is caused to travel with the wheel by reason of the interlocking engagement between said plungers and the recesses 20. This is of particular advantage when the wheel is mired, or otherwise placed where traction is difficult, because the hub and spokes may get up a certain amount of momentum before the plungers strike the end walls of the recesses 20, thereby imparting a shock to the tread member tending to give it a sudden movement which is very effective under the circumstances mentioned.

From the foregoing it will be seen that the wheel described is exceedingly simple in construction, but possesses great strength and durability, and is capable of being readily assembled or disassembled. The springs co-operating with the respective plungers provide all of the resiliency necessary for motor vehicles and at the same time are sufficiently strong to withstand the usual load.

In Figure 1, the tread member is shown as constructed of a solid casting with the rim riveted or otherwise secured thereto:

If a lighter tread member is desired, it may be made of stamped metal as indicated at 30, Figure 4, and provided with a wood or other filling 31, riveted to the walls of the member 30, the rim 32 being secured in any desired manner to said wood filling. In this form, the tread member 33 is also made of stamped metal and braced by a filler member 34 of wood or other material. Or the tread member may be made as illustrated in Figure 5, in which the body is formed of a stamped metal shell 35, having a filler 36, and a stamped metal rim 37, provided with a groove to receive the shell 35. Or the filler may be entirely omitted and the unfilled shell 38 employed as illustrated in Figure 6. If desired, the tread member 41 and tire rim 40 may be formed in one integral part, as illustrated in Figure 7.

Having thus explained the nature of the invention, and described an operative manner of constructing and using the same, although without attempting to set forth all of the forms in which it may be made or all of the forms of its use, what is claimed is:—

1. A wheel of the character described comprising a hub, a felly, hollow spokes rigidly connecting said hub and felly, a tread member having a body portion in telescoping engagement with said felly and free for circumferential movement, said body portion having spaced apart recesses in its inner edge, spring pressed plungers working in certain of said spokes and bearing against the bottom walls of said recesses to limit circumferential movement of the tread member, and shorter spring pressed plungers working in the other spokes and bearing against the inner edge of the tread member.

2. A wheel of the character described comprising a hub, a felly, provided with side flanges, hollow spokes rigidly connecting said hub and said felly, a tread member provided with a hollow metal body portion telescoping with the flanges of said felly and free for circumferential movement between said flanges, said body having spaced apart recesses in its inner edge, and spring pressed plungers working in the spokes and bearing against said tread member, the alternating plungers being of sufficient length to extend into said recesses to limit circumferential movement of the tread member.

In testimony whereof I have hereunto set my hand.

HENRY NICHOLS.